United States Patent
Kudo et al.

[11] Patent Number: 5,907,457
[45] Date of Patent: May 25, 1999

[54] MAGNETIC HEAD HAVING A SPACER FOR ADJUSTING A SLIDER HEIGHT

[75] Inventors: Noriaki Kudo; Hiroshi Sampei; Masashi Sato, all of Yamagata, Japan

[73] Assignee: Mitsumi Electric Co., Ltd, Tokyo, Japan

[21] Appl. No.: 08/902,065

[22] Filed: Jul. 29, 1997

[30] Foreign Application Priority Data

Jul. 30, 1996 [JP] Japan ................................ 8-216786

[51] Int. Cl.⁶ .................................................. G11B 5/58
[52] U.S. Cl. ........................................... 360/103; 360/104
[58] Field of Search .................... 360/97.01–98.01, 360/103, 104, 122, 123, 125

[56] References Cited

U.S. PATENT DOCUMENTS 5,485,336  1/1996  Matsunaga ........................... 360/125
5,572,490  11/1996  Kazama ............................... 360/103
5,576,912  11/1996  Mitsumata et al. ................. 360/103
5,796,556  8/1998  Boutaghou .......................... 360/104

*Primary Examiner*—Jefferson Evans
*Attorney, Agent, or Firm*—Whitham, Curtis & Whitham

[57] ABSTRACT

In a magnetic head for writing/reading a magnetic disk comprising sliders (15, 16) having sliding surfaces which are brought into contact with a surface of the magnetic disk so as to slide relatively to the magnetic disk and a spacer (20) for adjusting height of the sliders (15, 16), each of the sliders (15, 16) is formed from a nonmagnetic material consisting of calcium titanate, and the spacer (20) is formed from a ferrite-group magnetic material, the ferrite-group magnetic material being selected to have substantially the same coefficient of thermal expansion as that of the nonmagnetic material.

3 Claims, 2 Drawing Sheets

MAGNETIC HEAD HAVING A SPACER FOR ADJUSTING A SLIDER HEIGHT

BACKGROUND OF THE INVENTION

1. Field of the Invention

The present invention relates to the configuration of a magnetic head and a magnetic head device for writing/reading a magnetic disk having a standard capacity (low density) magnetic head core and a high capacity (high density) magnetic head core.

2. Related Art

Generally, a magnetic disk device such as a floppy disk device or the like is configured such that information is recorded/reproduced by using a magnetic head. The magnetic head is held on a head carriage and the head carriage is moved between inner and outer circumferential edges of a floppy disk so as to move the magnetic head to a desired position on the floppy disk. Recently, it becomes possible to perform high-density recording/reproducing so that floppy disks having recording capacity of 100 MB (megabyte) or more have been developed in comparison with conventional low-density floppy disks having recording capacity of 1 or 2 MB.

In a conventional magnetic head for writing/reading a magnetic disk, both a slider having a sliding surface and a spacer for adjusting the height of the slider are formed from a nonmagnetic material of calcium titanate, and the sliding surface of the slider is brought into contact with a surface of the magnetic disk so that the slider and the magnetic disk slide relatively to each other. Thus, the slider and the spacer are formed from the same material as described above so as to prevent generation of thermal deformation in the slider and the spacer due to heat generation in the magnetic head which slides relatively to the magnetic disk when the magnetic disk is rotated at a high speed particularly in the case of performing recording/reproducing by using a high-density magnetic head.

In the thus configured magnetic head, however, there has been such a problem that since a nonmagnetic material is used, the magnetic head is apt to be influenced not only by external magnetic noises but also by external electrical noises, has no degree of freedom in selection of the material, and is high in cost.

SUMMARY OF THE INVENTION

In view of the forgoing problem, according to the present invention, there is provided a magnetic head for writing/reading a magnetic disk, comprising: sliders having sliding surfaces which are brought into contact with a surface of the magnetic disk so as to slide relatively to the magnetic disk; and a spacer for adjusting height of the sliders, the above problem can be solved by forming each of the sliders from a nonmagnetic material consisting of calcium titanate, by forming the spacer from a ferrite-group magnetic material, and by selecting the ferrite-group magnetic material to have substantially the same coefficient of thermal expansion as that of the nonmagnetic material.

Further, the above problem can be solved, preferably, by selecting an Mn—Zn-group ferrite material as the magnetic material.

Further, the above problem can be solved, preferably, by making the spacer electrically conductive to a ground electrode of a flexible substrate fixed on a head carriage.

In the above-mentioned configuration, the spacer is formed from a ferrite-group magnetic material, and the ferrite-group magnetic material is selected to have substantially the same coefficient of thermal expansion as that of the nonmagnetic material. Therefore, even if a magnetic disk rotates at a high speed to thereby generate heat in the magnetic head, generation of thermal deformation in the slider and the spacer is prevented. Further, since a ferrite-group magnetic material is used, influence of external magnetic noises as well as external electrical noises are reduced. Moreover, since there exists a certain degree of freedom in selection of the material, the cost is reduced.

Also, in the case of selecting Mn—Zn-group ferrite as the magnetic material, thermal deformation of the slider and the spacer is prevented even when a magnetic disk rotates at a high speed to thereby generate heat in the magnetic head, and influence of external magnetic noises as well as external electrical noises is reduced.

Further, when the spacer is electrically conductively connected to the ground electrode of the flexible substrate fixed on the head carriage, the influence of external electrical noises is reduced more extremely.

DETAILED DESCRIPTION OF THE PREFERRED EMBODIMENTS

Figure 1:
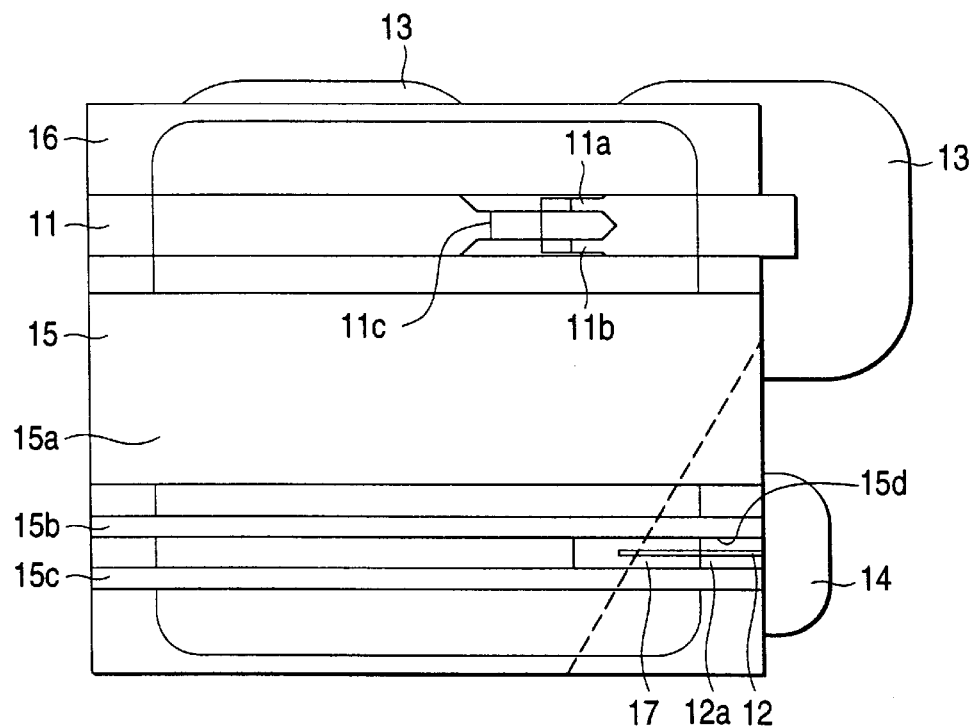
FIG. 1 is a plan view showing an embodiment of the magnetic head for writing/reading a magnetic disk according to the present invention.
Figure 2:
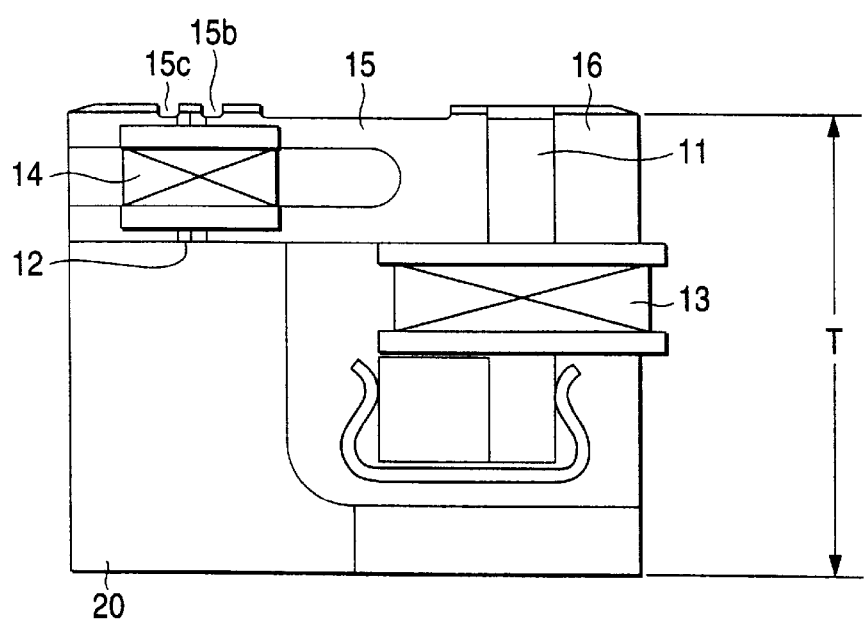
FIG. 2 is a side view showing the embodiment of the magnetic head for writing/reading a magnetic disk according to the present invention.

Referring to FIGS. 1 and 2, description will be made about an embodiment of a magnetic head for writing/reading a magnetic disk according to the present invention. In the drawings, the reference numeral 11 designates a low-density (standard capacity) magnetic head core having erasing head core gaps 11a and 11b and a recording/reproducing head core gap 11c; 12, a high-density magnetic head core having a recording/reproducing head core gap 12a; 13, a coil mounted on the magnetic head core 11; 14, a coil mounted on the magnetic head core 12; 15, a slider bonded at its one side to the magnetic head core 11 and having grooves 15a, 15b and 15c, and a notched opening portion 15d for fixing the magnetic head core 12 with glass 17; and 16, a slider bonded, at its one side, to the magnetic head core 11.

FIG. 2 is a side view showing the magnetic head. The reference numeral 20 designates a spacer for determining the height T of the magnetic head. The sliders 15 and 16 are formed from a nonmagnetic material constituting of calcium titanate, and the spacer 20 is formed from a ferrite-group magnetic material, for example, an Mn—Zn-group ferrite material, having substantially the same coefficient of thermal expansion as that of calcium titanate.

In the thus configured magnetic head, sliding surfaces of the sliders 15 and 16 contact with the surface of a magnetic disk so that the magnetic disk and the sliding surfaces slide relatively to each other with the rotation of the magnetic disk. Although heat is generated in the magnetic head at this time, no stress is generated in the spacer 20 and the sliders 15 and 16 because the coefficient of thermal expansion of the spacer 20 is substantially the same as that of the slider 15 and 16 so that deformation of the sliders 15 and 16 and the spacer 20 is reduced.

Further, since the material of the spacer 20 can be selected from magnetic materials of a ferrite group, the degree of freedom of selection of the material increases and selection of a suitable material brings about reduction in cost.

Moreover, a ferrite-group magnetic material has electrical conductivity so that external electrical noises can be reduced.

Figure 3:
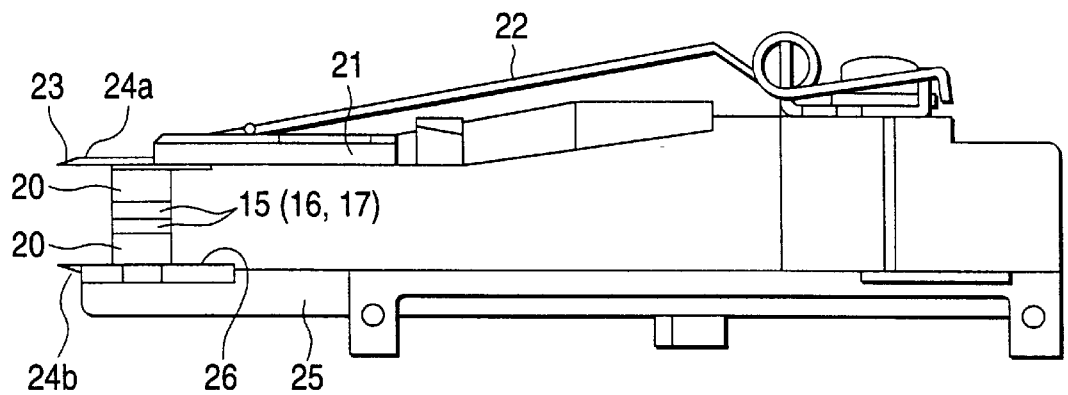
FIG. 3 is a side view showing an embodiment of the magnetic head device for writing/reading a magnetic disk according to the present invention.
Figure 4:
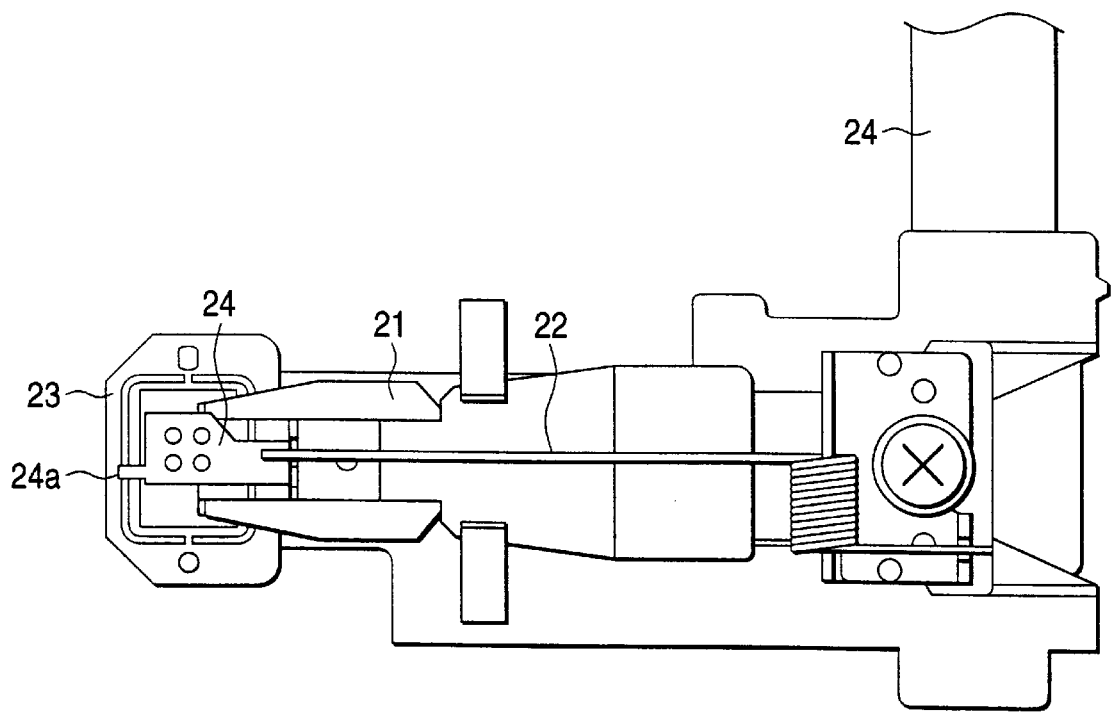
FIG. 4 is a plan view showing the embodiment of the magnetic head device for writing/reading a magnetic disk according to the present invention.

Referring to FIGS. 3 and 4, description will be made about an embodiment of a magnetic head device for writing/reading a magnetic disk according to the present invention. In this embodiment, the magnetic head according to the foregoing embodiment is assembled with a head carriage (constituted by a carriage arm and a carriage base). In the drawings, portions equivalent to those in FIGS. 1 and 2 are correspondingly referenced, and detailed description thereof is omitted.

In the drawings, the reference numeral 21 designates a resin-made carriage arm; 22, a spring for urging the carriage arm 21; 23, a gimbals formed from a plate-like metal material for fixing the above-mentioned spacer 20 of the magnetic head; and 24, a flexible substrate attached along the carriage arm 21 so as to be electrically conductive, at its front end portion, to lead wire of the coil of the magnetic head. In this case, in the flexible substrate 24, a part 24a of a ground electrode portion is projected and electrically conductively fixed to the gimbals 23, as shown in FIG. 4.

As a result, the spacer 20 of the magnetic head is electrically grounded through the gimbals 23. Therefore, even if external electrical noises reach the magnetic head, the noises are shut off by the spacer 20.

The reference numeral 25 designates a resin-made head carriage; and 26, a gimbals formed from a plate-like metal material and fixed on the head carriage for fixing the above-mentioned spacer 20 of the magnetic head. In this case, the flexible substrate 24 is electrically conductive to the lead wire of the coil of the magnetic head and the part 24a of the ground electrode portion of the flexible substrate 24 is projected and electrically conductively fixed on the gimbals 26.

As described above, also in the magnetic head device attached on the head carriage 25, the spacers 20 are grounded so that even if external electrical noises reach the magnetic head device, the noises are shut off by the spacers 20.

Although the ground electrode of the flexible substrate is electrically conductive to the spacers of the magnetic head through the gimbals in the foregoing explanation, the ground electrode of the flexible substrate may be directly electrically conductively fixed to the spacers of the magnetic head.

Of course, the present invention is not limited by this embodiment. The slider is capable for employing one unit structure.

As described above, according to the present invention, in a magnetic head for writing/reading a magnetic disk comprising sliders having sliding surfaces which are brought into contact with a surface of the magnetic disk so as to slide relatively to the magnetic disk and a spacer for adjusting height of the sliders, each of the sliders is formed from a nonmagnetic material consisting of calcium titanate, the spacer is formed from a ferrite-group magnetic material, and the ferrite-group magnetic material is selected to have substantially the same coefficient of thermal expansion as that of the nonmagnetic material. Therefore, even if the magnetic disk rotates at a high speed to thereby generate heat in the magnetic head, generation of thermal deformation in the sliders and the spacer is prevented. Further, since a ferrite-group magnetic material is used, influence of external magnetic noises as well as external electrical noises is reduced. Moreover, there exists a certain degree of freedom in material selection to thereby reduce the cost.

Also, in the case of selecting Mn—Zn-group ferrite as the magnetic material, generation of thermal deformation in the sliders and the spacers is prevented even when a magnetic disk rotates at a high speed to thereby generate heat in the magnetic head, and influence of external magnetic noises and external electric noises is reduced.

Further, when the spacer is made electrically conductive to the ground electrode of the flexible substrate fixed on the head carriage, the influence of external electrical noises is reduced more extremely.

What is claimed is:

1. A magnetic head for writing/reading a magnetic disk, comprising:

a slider having a sliding surface which is brought into contact with a surface of said magnetic disk so as to slide relative to said magnetic disk, said slider being formed from a nonmagnetic material selected from the group consisting of calcium titanate; and a spacer for adjusting height of said slider, said spacer being formed from a ferrite-group magnetic material, said ferrite-group magnetic material being selected to have substantially the same coefficient of thermal expansion as that of said nonmagnetic material, said spacer acting as a shield for reducing external electrical noise in said magnetic head.

2. A magnetic head for writing/reading a magnetic disk according to claim 1, wherein said magnetic material is made of an Mn—Zn-group ferrite material.

3. A magnetic head device for writing/reading a magnetic disk according to claim 1, wherein said spacer is made electrically conductive to a ground electrode of a flexible substrate fixed on a head carriage.

* * * * *